(12) United States Patent
Feldmann et al.

(10) Patent No.: US 6,517,741 B1
(45) Date of Patent: Feb. 11, 2003

(54) COLOR DISPLAY SCREEN WITH COLOR PIGMENT

(75) Inventors: Claus Feldmann, Aachen (DE); Joachim Opitz, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/483,873

(22) Filed: Jan. 18, 2000

(30) Foreign Application Priority Data

Jan. 16, 1999 (DE) .......................................... 199 01 539

(51) Int. Cl.$^7$ ............................................... C09K 11/56
(52) U.S. Cl. ........................... 252/301.45; 252/301.4 R; 252/301.4 P; 252/301.4 H; 252/301.4 F; 252/301.5; 252/301.6 R; 252/301.6 S; 252/301.6 P
(58) Field of Search .................................. 313/467, 468, 313/461; 252/301.4 R, 301.4 H, 301.4 S, 301.6 R, 301.6 S, 301.6 P, 301.4 P, 301 S; 428/403, 404

(56) References Cited

U.S. PATENT DOCUMENTS

| 4,307,320 A | * | 12/1981 | Kotera et al. | ......... | 252/301.4 S |
| 4,309,481 A | * | 1/1982 | Wakatsuki et al. | ..... | 252/301.4 R |
| 5,126,166 A | | 6/1992 | Dutta et al. | ..................... | 427/67 |
| 5,744,061 A | * | 4/1998 | Bredol et al. | ......... | 252/301.4 R |
| 5,766,336 A | * | 6/1998 | Jansen et al. | ................ | 106/461 |

FOREIGN PATENT DOCUMENTS

EP 0697373 2/1996 ......... C01B/21/082

* cited by examiner

Primary Examiner—C. Melissa Koslow

(57) ABSTRACT

A color display screen comprises a red phosphor and a color pigment having a general formula selected from the group consisting of: $A_{1-x}A'_xBO_{2-x}N_{1+x}$, where $0<x<1$, A is Mg(II), Ca(II), Sr(II), Ba(II) or Zn(II), A' is a trivalent rare earth metal, Bi(III), Al(III) or Fe(III), B is V(V), Nb(V), Ta(V) or W(V); $AB_{1-x}B'_xBO_{1+x}N_{2-x}$, where $0<x<1$, A is Mg(II), Ca(II), Sr(II), Ba(II) or Zn(II), A' is a trivalent rare earth metal, Bi(III), Al(III) or Fe(III), B is V(V), Nb(V), Ta(V) or W(V) and B' is Ti(IV), Zr(IV), Hf(IV), Sn(IV), Ge(IV), Si(IV), Nb(IV) or Ta(IV); $A_yA'_{2-y}B_2O_{5+y}N_{2-y}$, where $0<y<2$, A is Mg(II), Ca(II), Sr(II). Ba(II) or Zn(II), A' is a trivalent rare earth metal, Bi(III), Al(III) or Fe(III), B is V(V), Nb(V), Ta (V) or W(V); $A_2B_{2-y}B'_yO_{5+y}N_{2-y}$, where $0<y<2$, A is Mg(II), Ca(II), Sr(II). Ba(II) or Zn(II), B is V(V), Nb(V), Ta(V) or W(V), and B' is Ti(IV), Zr(IV), Hf(IV), Sn(IV), Ge(IV), Si(IV), Nb(IV) or Ta(IV); $CD_{2-m}D'_mO_{4-m}N_m$, where $0<m<2$, C is Mg(II), Ca(II), Mn(II), Fe(II), Co(II), Ni(II) or Zn(II) and D is Al(III), Ga(III), In(III), Ti(III), V(III), Cr(III), Fe(III), Co(III) or Ni(III) and D' is Ti(IV), Zr(IV), Hf(IV), Sn(IV), Ge(IV), Si(IV), Nb(IV) or Ta(IV); $C_{1-n}C'_nD_2O_{4-n}N_n$, where $0<n<2$, C is Mg(II), Ca(II), Mn(II), Fe(II), Co(II), Ni(II) or Zn(II), C' is Al(III), Ga(III), In(III), Ti(III), V(III), Cr(III), Fe(III), Co(III) or Ni(III), D is Al(III), Ga(III), In(III), Ti(III), V(III), Cr(III), Fe(III), Co(III) or Ni(III); $A'_2CBO_5N$, where A' is a trivalent rare earth metal, Bi(III), Al(III) or Fe(III), C is Mg(II), Ca(II), Mn(II), Fe(II), Co(II), Ni(II) or Zn(II), B is V(V), Nb(V), Ta(V) or W(V); $A'_2A''BO_4N_2$, where A' is a trivalent rare earth metal, Bi(III), Al(III) or Fe(III), A" is trivalent rare earth metal, Bi(III), B is V(V), Nb(V), Ta(V) or W(V); or $A'_2DBO_3N_3$, where A' is a trivalent rare earth metal, Bi(III), Al(III) or Fe(III), D is Al(III), Ga(III), In(III), Ti(III), V(III), Cr(III), Fe(III), Co(III) or Ni(III), and B is V(V), Nb(V), Ta(V) or W(V).

1 Claim, 1 Drawing Sheet

COLOR DISPLAY SCREEN WITH COLOR PIGMENT

BACKGROUND OF THE INVENTION

The invention relates to a color display screen, in particular for a color display tube, a color monitor or a plasma display, with a red phosphor and a color pigment.

Color display screens and color monitors are frequently used in bright ambient light. To improve the visibility of the image on the screen under these lighting conditions and to reduce visual fatigue, the display screen should be non-dazzling and exhibit a low reflection and a high contrast.

The contrast can be maximized by increasing the influence of the external light source in comparison with the luminance of the phosphors in the display screen coating. This can be achieved, for example, by means of color filters in the form of inorganic pigments, which color filters are selected so as to be as transparent as possible to the color emitted by the phosphor in question, while they absorb the other spectral components, so that the diffuse reflection of ambient light at the phosphor powder is suppressed.

A color pigment which is suitable for the pigmentation of a phosphor must exhibit absorption properties which correspond to the emission characteristic of the phosphor. In addition, it is required that a pigmentation for phosphor coatings is stable in a vacuum, that electron bombardment or gas discharges do not cause degradation of said pigmentation, that the pigmentation is inert with respect to reducing, oxidizing or hydrolyzing reagents and does not decompose at an increased temperature.

EP-A-0 697 373 discloses color pigments for use in the manufacture of glass colors which can be stoved, and for tinting glazes which can be stoved at temperatures below 700° C., as well as for tinting synthetic resins, lacquers and cosmetic articles on the basis of oxide-nitride pigments whose atomic ratio between nitrogen and oxygen determines the color, and which pigments crystallize in the pyrochlore structure of the general formula $A_xA'_{2-x}B_2O_{5+x}N_{2-x}$ or $A'_2B_{2-y}B'_yO_{5+y}N_{2-y}$, where A, A', B and B' represent one or more cations of the series A: Mg(II), Ca(II), Sr(II), Ba(II), Zn(II); A': Ln(=trivalent rare earth metal) Bi(III), Al(III), Fe(III); B: V(V), Nb(V), Ta(V), Mo(V), W(V); B': Ti(IV), Zr(IV), Hf(IV), Sn(IV), Ge(IV), Si(IV), Nb(IV), Ta(IV), and x and y represent a number which is greater than or equal to 0 and smaller than 2, with the exception of $Ln_2Ta_2O_5N_2$ or cations crystallizing in the spinel structure and exhibiting the general formula $CD_{2-m}D'_mO_{4-m}N_m$ or $C_{1-n}C'_nD_2O_{4-n}N_n$, where C, C', D and D' represent one or more cations of the series C: Mg(II), Ca(II), Mn(II), Fe(II), Co(II), Ni(II), Zn(II); D: Al(III), Ga(III), In(III), Ti(III), V(III), Cr(III), Ge(III), Co(III), Ni(III); D': Ti(IV), Zr(IV), Hf(IV), Sn(IV), Ge(IV), Si(IV), Nb(IV), Ta(IV); C': Al(III), Ga(III), In(III), Ti(III), V(III), Cr(III), Fe(III), Co(III), Ni(III), and m is a number which is greater than 0 and smaller than or equal to 2, and n is a number which is greater than 0 and smaller than or equal to 1, or cations which crystallize in an elpasolite structure and whose general formula can be written as $A_2QBO_{5-z}N_{1+z}$, where z represents 0, 1 or 2, and if z is equal to 0, Q is a bivalent metal ion C, if z is equal to 1, Q is a trivalent metal ion A", and if z is equal to 2, Q is a quadrivalent metal ion D in accordance with the formulae $A'_2CBO_5N$, $A'_2A"BO_4N_2$, $A'_2DBO_3N_3$, where A, B, S and D have the above-mentioned meaning, and A" represents Ln(III) or Bi(III). EP-A-0697 373 also discloses color pigments with an increased brilliance on the basis of oxide nitrides present in the perovskite structure, their atomic ratio between nitrogen and oxygen being the determining factor for the color, said oxide nitrides being of the general formula $A_{1-u}A'_uBO_{2-u}N_{1+u}$ or $A'B_{1-w}B'_wO_{1+w}N_{2-w}$, where A, A', B and B' represent one or more cations of the series A: Mg(II), Ca(II), Sr(II), Ba(II), A': Ln(III), Bi(III), Al(III), Fe(III); B: V(V), Nb(V), Ta(V); B': Ti(IV), Zr(IV), Hf(IV), Sn(IV), Ge(IV), and u and w represent a number between 0 and 1, whereby, however, for A' is Ln(III), u≠1 and w≠u.

OBJECTS AND SUMMARY OF THE INVENTION

It is an object of the invention to provide a color display screen with a red phosphor and a color pigment, which provides a high-contrast image, exhibits a small reflectance for external light, a high emission luminance and a good emission color quality, and which can be economically manufactured.

In accordance with the invention, this object is achieved by a color display screen comprising a red phosphor and a color pigment having a general formula selected from the group consisting of:

$A_{1-x}A'_xBO_{2-x}N_{1+x}$, where 0<x<1, A is Mg(II), Ca(II), Sr(II), Ba(II) or Zn(II), A' is a trivalent rare earth metal, Bi(III), Al(III) or Fe(III), B is V(V), Nb(V), Ta(V) or W(V);

$AB_{1-x}B'_xBO_{1+x}N_{2-x}$, where 0<x<1, A is Mg(II), Ca(II), Sr(II), Ba(II) or Zn(II), A' is a trivalent rare earth metal, Bi(III), Al(III) or Fe(III), B is V(V), Nb(V), Ta(V) or W(V) and B' is Ti(IV), Zr(IV), Hf(IV), Sn(IV), Ge(IV), Si(IV), Nb(IV) or Ta(IV);

$A_yA'_{2-y}B_2O_{5+y}N_{2-y}$, where 0<y<2, A is Mg(II), Ca(II), Sr(II). Ba(II) or Zn(II), A' is a trivalent rare earth metal, Bi(III), Al(III) or Fe(III), B is V(V), Nb(V), Ta(V) or W(V);

$A_2B_{2-y}B'_yO_{5+y}N_{2-y}$, where 0<y<2, A is Mg(II), Ca(II), Sr(II). Ba(II) or Zn(II), B is V(V), Nb(V), Ta(V) or W(V), and B' is Ti(IV), Zr(IV), Hf(IV), Sn(IV), Ge(IV), Si(IV), Nb(IV) or Ta(IV);

$CD_{2-m}D'_mO_{4-m}N_m$, where 0<m<2, C is Mg(II), Ca(II), Mn(II), Fe(II), Co(II), Ni(II) or Zn(II) and D is Al(III), Ga(III), In(III), Ti(III), V(III), Cr(III), Fe(III), Co(III) or Ni(III) and D' is Ti(IV), Zr(IV), Hf(IV), Sn(IV), Ge(IV), Si(IV), Nb(IV) or Ta(IV);

$C_{1-n}C'_nD_2O_{4-n}N_n$, where 0<n<2, C is Mg(II), Ca(II), Mn(II), Fe(II), Co(II), Ni(II) or Zn(II), C' is Al(III), Ga(III), In(III), Ti(III), V(III), Cr(III), Fe(III), Co(III) or Ni(III), D is Al(III), Ga(III), In(III), Ti(III), V(III), Cr(II), B Co(III) or Ni(III);

$A'_2CBO_5N$, where A' is a trivalent rare earth metal, Bi(III), Al(III) or Fe(III), C is Mg(II), Ca(III), Mn(II), Fe(II), Co(II), Ni(II) or Zn(II), B is V(V), Nb(V), Ta(V) or W(V);

$A'_2A"BO_4N_2$, where A' is a trivalent rare earth metal, Bi(III), Al(III) or Fe(III), A" is trivalent rare earth metal, Bi(III), B is V(V), Nb(V), Ta(V) or W(V); or $A'_2DBO_3N_3$, where A' is a trivalent rare earth metal, Bi(III), Al(III) or Fe(III), D is Al(III), Ga(III), In(III), Ti(III), V(III), Cr(III), Fe(III), Co(III) or Ni(III), and B is V(V), Nb(V), Ta(V) or W(V).

A color display screen comprising a red phosphor and one of the above-mentioned oxide-nitride pigments provides a high-contrast, low-reflection image, because, as a result of the mixed-crystal properties of these oxide-nitride pigments, the absorption properties of these pigments can be accurately adapted to the emission spectrum of the phosphor. The absorption edges can be shifted throughout the range of the visible spectrum by choosing the composition, particularly the O/N ratios. In comparison with conventional $Fe_2O_3$ pigments, said oxide-nitride pigments are characterized by steeper absorption edges in the yellow-red spectral region and by a high absorbing power. This enables the pigment-containing layers to be thin and the pigment quantities to be small. The oxide-nitride pigments in accordance with the invention can be easily prepared and readily processed in a phosphor composition. They adhere well to the surface of the known red phosphors. They are resistant to electron radiation and gas discharges, and they exhibit a very low vapor pressure, a sufficient temperature resistance up to 700° C. and they are not toxic.

These and other aspects of the invention will be apparent from and elucidated with reference to the embodiments described hereinafter.

Figure 1:
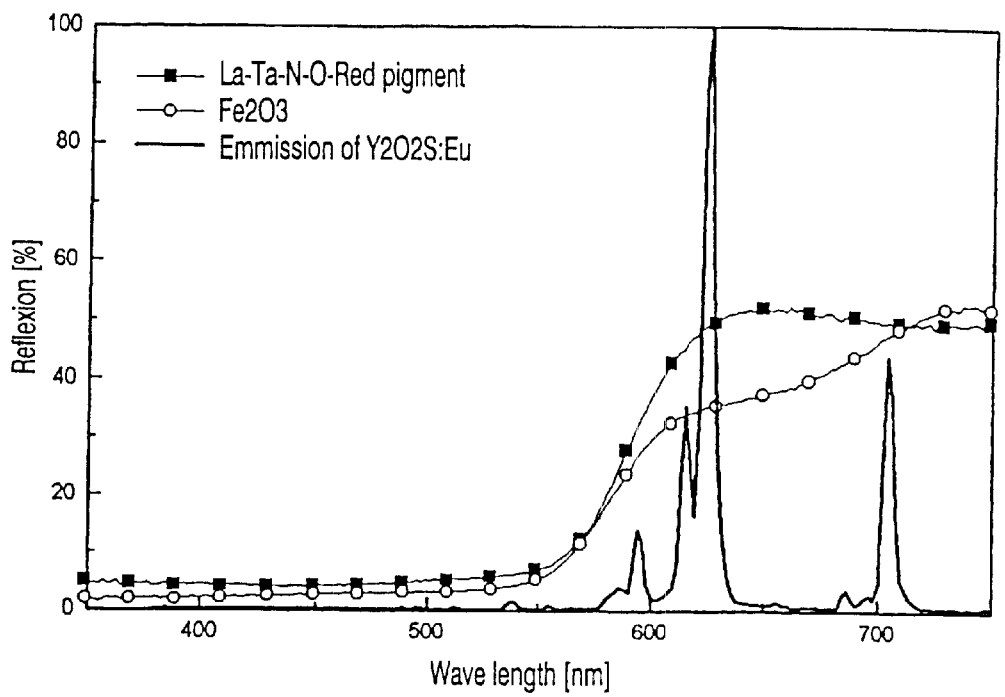
FIG. 1 shows the diffuse reflection of a red oxide-nitride pigment in comparison with a conventional red $Fe_2O_3$ pigment and in comparison with the emission of $Y_2O_2S$:Eu.
Figure 2:
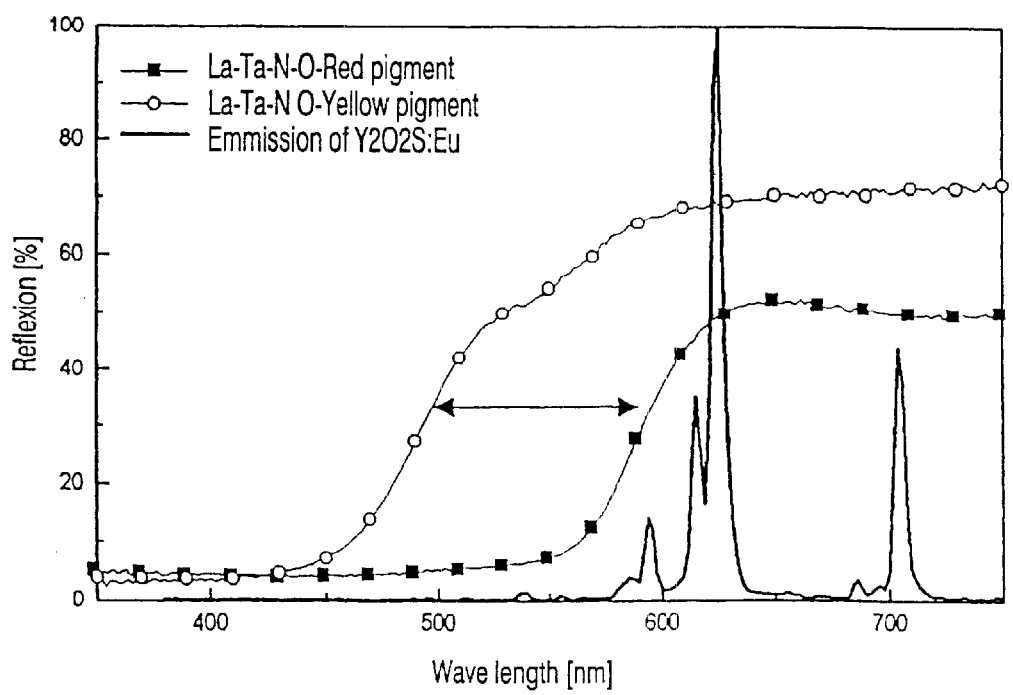
FIG. 2 shows the diffuse reflection of a red and a yellow oxide-nitride pigment in comparison with the emission of $Y_2O_2S$:Eu.

A color display screen in accordance with the invention comprises a red phosphor and an oxide-nitride pigment. The red-luminescent phosphors which can be used for the invention are oxide-halogenides, for example YOCl:Eu, YOBr:Eu, LaOF:Eu, or binary oxides, for example CaO:Eu, $Y_2O_3$:Eu, $La_2O_3$Eu, $ThO_2$:Eu, or borates, for example $MgB_2O_4$:Mn, $SrB_2O_4$:Sm, $MgYBO_4$:Eu, $LaBO_3$:Eu, $LaAl_3B_4O_{12}$:Eu, $YAl_3B_4O_{12}$:Eu or aluminates, for example $LiAlO_2$:Fe, $YAlO_3$:Eu, or silicates, for example $Ca_2MgSi_2O_7$:Eu,Mn, or phosphates, for example $Zn_3(PO_4)_2$:Mn, $MgBaP_2O_7$:Eu,Mn or sulfates, for example $SrSO_4$:Bi, or molybdates, wolframates or vanadates, for example $CaMoO_4$:Eu, $La_2W_3O_{12}$:Eu, $YVO_4$:Eu, $LaVO_4$:Eu or sulfides, for example ZnS:Mn,Te; ZnS:Sn, CaS:Eu, $ZnGa_2S_4$:Mn, $Y_2O_2S$:Eu.

DESCRIPTION OF THE PREFERRED EMBODIMENTS

The properties of the oxide-nitride pigments used are subject to the mixing rule, i.e., the properties change continually with the composition. Dependent upon the composition, the color of the pigment varies between red and yellow. As a result, selection of a suitable composition enables the position of the absorption edges of the oxide-nitride pigment to be optimized and the absorption spectrum to be flexibly adjusted to the emission bands of the phosphor used. Particularly as a constituent of a green pigment, an optimum adaptation also to phosphors emitting in a narrow band, such as terbium-activated phosphors, for example $Y_2SiO_5$:Tb or LaOBr:Tb, and the like, can be achieved in this manner. By using two oxide-nitride pigments with a well-defined distance between their absorption edges, also a transmission window can be defined. In particular for phosphors emitting in a narrow band, such as $Y_2SiO_5$:Tb or LaOBr:Tb, a yellowish orange oxide-nitride pigment can be combined with a bluish green pigment to form an optimum green pigment.

Dependent upon the particle size of the oxide-nitride pigment, the color-filter layers manufactured by means of said pigment are transparent or non transparent. Oxide-nitride pigments having a particle size which is small enough to form transparent layers cannot only be used for the pigmentation of the phosphors but can also be provided as a separate color filter layer between the display screen glass and the phosphor layer.

To manufacture the color display screen, use is made of a red phosphor. To cover the red phosphor with an oxide-nitride pigment, first, stable aqueous suspensions of the phosphor, and of the pigment, are prepared. To achieve this, agglomerated particles must first be mechanically reduced in size. Red phosphors, such as $Y_2O_2S$:Eu, are disagglomerated in an alkaline solution (pH=8.5 to 9.5) using suitable grinding aids. The addition of alkali-metal silicates (0.01 to 0.1% by weight), small-grain colloidal $SiO_2$ (0.01 to 0.1% by weight, particle diameter 10 to 40 nm) or organic polymers (gelatins, acrylic acids, melamine resins, urea resins, polyurethanes etc., 0.01 to 0.1% by weight) may be helpful in this respect. After the disagglomeration, the phosphor suspension is stable in the neutral to alkaline pH range. The above-mentioned oxide-nitride pigments are also disagglomerated by means of suitable grinding bodies and by adding alkali-metal silicates (0.01 to 0.05% by weight with respect to the phosphor to be pigmented), small-grain colloidal $SiO_2$ (0.01 to 0.05% by weight with respect to the phosphor to be pigmented, particle diameter: 10 to 40 nm) and/or an organic polymer (gelatins, acrylic acids, melamine resins, urea resins, polyurethanes etc., 0.01 to 0.1% by weight with respect to the phosphor to be pigmented).

Subsequently, the surface of the phosphor is first coated with a binder to guarantee the adhesion of the pigment. For the binder systems use can be made of systems which are also used for the customary pigmentation of red phosphors with $Fe_2O_3$. These may be inorganic oxides, but also organic polymers such as gelatins, acrylic acids, melamine resins, urea resins, polyurethanes etc. At a neutral pH-value, the stable pigment suspension may subsequently be slowly drop-wise added to the phosphor suspension. After some time, the pigment reliably adheres to the surface of the phosphor. Finally, the pigmented phosphor may be covered with further inorganic oxides or organic polymers.

To manufacture the color display screen, for example, the color display screen glass may first be coated by means of a photolithographic process with the pattern of a black matrix. Subsequently, the pattern of the three primary colors, i.e. blue, red and green, are provided using suspensions of pigmented phosphors in three successive photolithographic steps in accordance with known methods. Alternatively, the phosphors may be provided in a printing process. If use is made of color filter layers between the color display screen glass and the phosphor layers, the phosphors are not pigmented. Instead, a layer of the oxide-nitride pigment is provided, either together with the phosphor or in a separate step, on the screen glass in such a manner that this layer is positioned between the screen glass and the corresponding phosphor pattern. The provision may take place photolithographically using suspensions of the oxide-nitride pigments or, alternatively, by a printing process. The finished color display screen coating comprising all three colors, and possibly color filter layers, can be provided, for normal applications in color display tubes or color monitors, with an aluminum film on the rear side, and finally be mounted to the finished tube.

EXAMPLE 1

A stable suspension of an oxide-nitride pigment is obtained when 3.2 g lanthanum-tantalum oxide-nitride is mixed with 120 ml demineralized water and 3 ml of a 15% potassium-silicate solution and subjected to wet-grinding for 4 days. Furthermore, 800 g red $Y_2O_2S$:Eu phosphor powder is coarsely sieved and washed a number of times with demineralized water. Demineralized water is added to the suspension thus purified to form a suspension having a volume of 1 l. The pH-value of the suspension is set to 9.3 with 2 molar sodium hydroxide solution. In addition, 8 ml of a suspension containing 3–5% by weight $SiO_2$ having a particle diameter of 10 to 40 nm are added. The combined suspensions are stirred for 30 minutes, whereafter grinding bodies are added and a wet-grinding operation is carried out for 2 hours. After separating the grinding bodies, a stable suspension with a volume of 3 l is obtained, whose pH-value is set to 7.0 by means of 2 molar hydrochloric acid. The suspension is stirred for 30 minutes whereafter a solution of 2.17 g zinc acetate dihydrate in 50 ml water is added. Subsequently, the pH-value is slowly increased to 9.3 by means of 2 molar sodium hydroxide solution. After stirring for 30 minutes, the pH-value is set to 7.3 by means of 2 molar hydrochloric acid. After stirring for another 30 minutes, the suspension of the oxidenitride pigment is slowly added drop-wise while stirring. Meanwhile, the pH-value is maintained in a range from 6.8 to 7.5. The suspension is stirred for another hour, the pigmented $Y_2O_2S$:Eu phosphor is allowed to sediment and subsequently filtered off, The filter cake is subsequently washed three times with 100 ml demineralized water each time. The coated phosphor is then dried for 15 hours at 140° C. and passed through a sieve having a mesh size of 36 μm.

EXAMPLE 2

Stable suspensions comprising a red-luminescent $Y_2O_2S$:Eu phosphor powder as well as stable suspensions comprising an oxide-nitride pigment are prepared as described in example 1. After stirring for thirty minutes, a solution of 0.8 g gelatin in 200 ml hot water is added to the stable phosphor suspension (pH-value: 6.8 to 7.2). After stirring for another 30 minutes, the stable pigment suspension is slowly added drop-wise while stirring. Throughout this period of time, the pH-value is maintained in a range from 6.8 to 7.5. The suspension is stirred for another hour, whereafter the pigmented $Y_2O_2S$:Eu phosphor is allowed to sediment and is then filtered off. The filter cake is subsequently washed three times with 100 ml demineralized water each time. The coated phosphor is then dried for approximately 15 hours at 140° C. in air and sieved by means of a steel sieve (pore size 36 μm).

EXAMPLE 3

A stable suspension comprising a red-luminescent $Y_2O_2S$:Eu phosphor powder as well as an oxide-nitride pigment is prepared as described in example 1. A quantity of 420 g of this suspension is mixed with 180 g of a 0.5% solution of a hydrophobically modified acrylate-methacrylate copolymer having a pH value >7. The polymer-containing suspension is applied to the inner surface of a display screen provided with a photolithographically structured polymer layer, and is subsequently dried. An oxide-nitride pigment layer having a thickness of 1.2 μm is obtained. The structured polymer layer is softened by subjecting it to an acid treatment, whereafter it is rinsed with water causing said polymer layer and the pigment layer deposited thereon to be peeled off. Only the pigment layer applied directly onto the display screen glass adheres so strongly to the glass that the rinsing operation does not peel off these parts. As a result, a structured pigment layer is obtained.

What is claimed is:

1. A color display screen comprising a red phosphor and a color pigment having a general formula selected from the group consisting of:

$A_{1+x}A'_xBO_{2-x}N_{1+x}$, where $0<x<1$, A is Mg(II), Ca(II), Sr(II), Ba(II) or Zn(II), A' is a trivalent rare earth metal, Bi(III), AL(III) or Fe(III), B is V(V), Nb(V), Ta(V) or W(V);

$AB_{1-x}B'_xBO_{1+x}N_{2-x}$, where $0<x<1$, A is Mg(II), Ca(II), Sr(II), Ba(II) or Zn(II), A' is a trivalent rare earth metal, Bi(III), Al(III) or Fe(III), B is V(V), Nb(V), Ta(V) or W(V) and B' is Ti(IV), Zr(IV), Hf(IV), Sn(IV), Ge(IV), Si(IV), Nb(IV) or Ta(IV);

$A_yA'_{2-y}B_2O_{5+y}N_{2-y}$, where $0<y<2$, A is Mg(II), Ca(II), Sr(II). Ba(II) or Zn(II), A' is a trivalent rare earth metal, Bi(III), Al(III) or Fe(III), B is V(V), Nb(V), Ta(V) or W(V), $A_2B_{2-y}B'_yO_{5+y}N_{2-y}$, where $0<y<2$, A is Mg(II), Ca(II), Sr(II). Ba(II) or Zn(II), B is V(V), Nb(V), Ta(V) or W(V), and B' is Ti(IV), Zr(IV), Hf(IV), Sn(IV), Ge(IV), Si(IV), Nb(IV) or Ta(IV);

$CD_{2-m}D'_mO_{4-m}$, where $0<m<2$, C is Mg(II), Ca(II), Mn(II), Fe(II), Co(II), Ni(II) or Zn(II) and D is Al(III), Ga(III), In(III), Ti(III), V(III), Cr(III), Fe(III), Co(III) or Ni(III) and D' is Ti(IV), Zr(IV), Hf(IV), Sn(IV), Ge(IV), Si(IV), Nb(IV) or Ta(IV);

$C_{1-n}C'_nD_2O_{4-n}N_n$, where $0<n<2$, C is Mg(II), Ca(II), Mn(II), Fe(II), Co(II), Ni(II) or Zn(II), C' is Al(III), Ga(III), In(III), Ti(III), V(III), Cr(III), Fe(III), CO(III) or Ni(III), D is Al(III), Ga(III), In(III), Ti(III), V(III), Cr(III), Fe(III), Co(III) or Ni(III);

$A'_2CBO_5N$, where A' is a trivalent rare earth metal, Bi(III), Al(III) or Fe(III), C is Mg(II), Ca(II), Mn(II), Fe(II), Co(II), Ni(II) or Zn(II), B is V(V), Nb(V), Ta(V) or W(V);

$A'_2A''BO_4N_2$, where A' is a trivalent rare earth metal, Bi(III), Al(III) or Fe(III), A'' is trivalent rare earth metal, Bi(III), B is V(V), Nb(V), Ta(V) or W(V); or $A'_2DBO_3N_3$, where A' is a trivalent rare earth metal, Bi(III), AL(III) or Fe(III), D is Al(III), Ga(III), In(III), Ti(III), V(III), Cr(III), Fe(III), Co(III) or Ni(III), and B is V(V), Nb(V), Ta(V) or W(V).

\* \* \* \* \*